(12) United States Patent
Yang et al.

(10) Patent No.: US 7,895,310 B2
(45) Date of Patent: Feb. 22, 2011

(54) NETWORK MANAGEMENT SYSTEM AND METHOD FOR SUPPORTING MULTIPLE PROTOCOLS

(75) Inventors: Won-Jong Yang, Suwon-si (KR); Sang-Gil Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1290 days.

(21) Appl. No.: 11/415,167

(22) Filed: May 2, 2006

(65) Prior Publication Data
US 2006/0253563 A1 Nov. 9, 2006

(30) Foreign Application Priority Data
May 6, 2005 (KR) .................... 10-2005-0038151

(51) Int. Cl.
*G06F 15/173* (2006.01)
(52) U.S. Cl. .............. 709/223; 709/206; 709/217; 709/219; 709/224; 709/226
(58) Field of Classification Search ............ 709/206, 709/223, 217, 219, 224, 226
See application file for complete search history.

(56) References Cited

U.S. PATENT DOCUMENTS

| | | | |
|---|---|---|---|
| 5,870,749 A | | 2/1999 | Adusumilli |
| 7,386,562 B2 * | | 6/2008 | Long .......................... 1/1 |
| 2002/0052968 A1 * | | 5/2002 | Bonefas et al. ............ 709/231 |
| 2006/0253563 A1 * | | 11/2006 | Yang et al. ................. 709/223 |
| 2010/0061292 A1 * | | 3/2010 | Weinstein .................. 370/315 |

FOREIGN PATENT DOCUMENTS

| | | |
|---|---|---|
| EP | 1389850 | 2/2004 |
| WO | 00/76228 | 12/2000 |

OTHER PUBLICATIONS

EP Search Report dated Sep. 16, 2010 for EP Application No. 06009124.6 corresponding to U.S. Appl. No. 11/415,167.

* cited by examiner

*Primary Examiner* — Liangche A Wang
(74) *Attorney, Agent, or Firm* — H.C. Park & Associates, PLC

(57) ABSTRACT

Provided is a network management system including a management message storage for registering a key of a management message for network management and a value of the key according to a map configuration; a network management message processing unit for transmitting the management message including the key mapped to the key value of the management message storage for the network management, and a network element receives a management message from the network management processing unit, it extracts a key value corresponding to a key included in the management message from the management message storage, accesses an information value based on the key value from a Management Information Base (MIB), and transmits the information value to the network management processing unit According to the provided network management system, it is not only possible to support a variety of network management protocols, but an existing message configuration is unaffected even when a new protocol is supported.

30 Claims, 6 Drawing Sheets

NETWORK MANAGEMENT SYSTEM AND METHOD FOR SUPPORTING MULTIPLE PROTOCOLS

CLAIM OF PRIORITY

This application makes reference to, incorporates the same herein, and claims all benefits accruing under 35 U.S.C. §119 from an application for NETWORK MANAGEMENT SYSTEM AND METHOD filed in the Korean Intellectual Property Office on May 6, 2005 and there duly assigned Serial No. 10-2005-0038151.

BACKGROUND OF THE INVENTION

1. Field of the Invention

The present invention relates to a network management system, and more particularly, to a network management system capable of supporting a variety of protocols (multi-protocols) used to manage network equipment by converting a management message structure into meta data, and a management message used in the system.

2. Description of the Related Art

Currently, as network scale increases, demand for complexity, inter-operability, speed, and flexibility is increasing, and thus it is necessary to be able to check whether a network is operating efficiently and normally. Here, a software management tool for managing a large-scale network makes its entrance, and a protocol for communicating with network hardware, and a program (agent) residing and operating in network equipment, are needed. So, the International Organization for Standardization (ISO) defines network management functions (FCAPS) such as Fault Management, Configuration Management, Security Management, Performance Management, and Accounting Management, which are to be performed by the network management system.

Figure 1A:
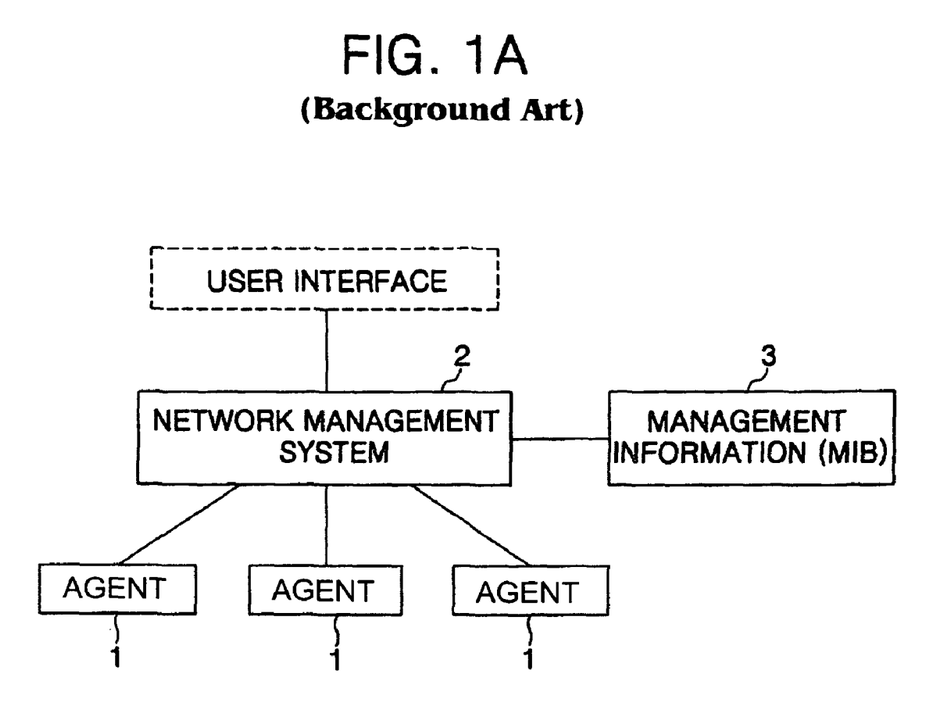
FIG. 1A is a block diagram showing a configuration of a general network management system.

Such a network system for embodying network management functions is comprised of an agent 1, a network management system 2, a network management protocol, and management information 3, as shown in FIG. 1A.

First, the agent 1 refers to a program used in equipment to be controlled in the network, and can be included in a host system comprised of various kinds of servers (file server, application server, communication server, and the like), a workstation, a main frame, a printer, and other peripherals, network equipment such as a router, a switch, a hub, a gateway, and other apparatuses, and a media device that is related with a cable system, topology, and the like.

Further, the network management system 2 refers to a station that receives management messages from the agent 1 and drives the network management application to perform network management directly.

Further, the network management protocol is used to exchange useful information between the equipment to be managed and the management station, and representative standard protocols include Simple Network Management Protocol (SNMP), Common Object Request Broker Architecture (CORBA), Transaction Language 1 (TL1), and so on.

Further, the management information 3 refers to a collection of information that can be assessed through the network management protocol, and representative management information is Management Information Base (MIB).

Figure 1B:
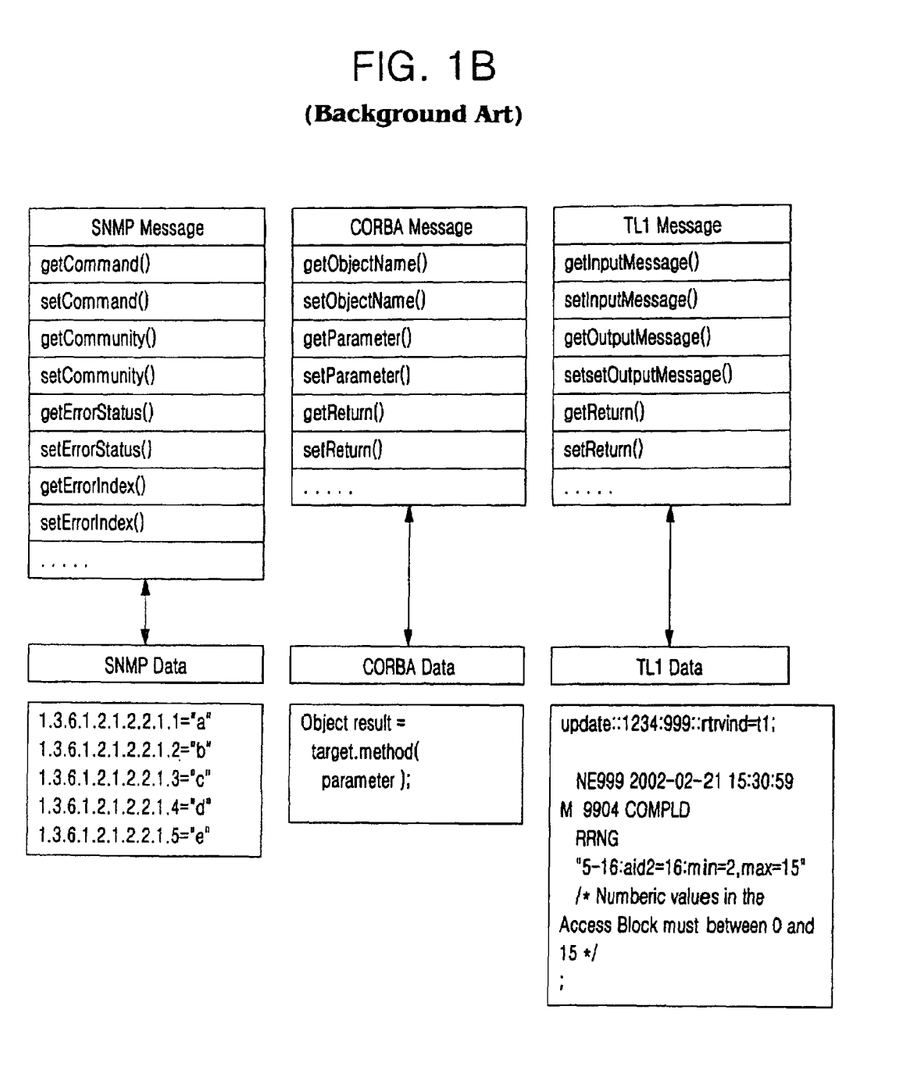
FIG. 1B is a diagram showing a management message of a general network management system.

Here, since a variety of equipment has to be managed simultaneously in the network management system, in most cases the above-described kinds of equipment use different management protocols. Accordingly, in order to support various protocols in the network management system, messages have generally come to be expressed as one of the following two types:

First, in a protocol-specific type, each protocol is defined as a specific type as shown in FIG. 1B. And then when a corresponding type of message arrives from an external system, it is converted to correspond to a protocol type and used.

However, in the network management system using a conventional protocol-specific type, development is progressing toward using one kind of protocol in most cases. In the event that a new protocol is needed, a new message class is usually embodied at the point of time the new protocol is needed. In which case, since there is no alternative choice but to bring changes into a conventional communication scheme or message type, the entire system should be corrected.

Figure 1C:
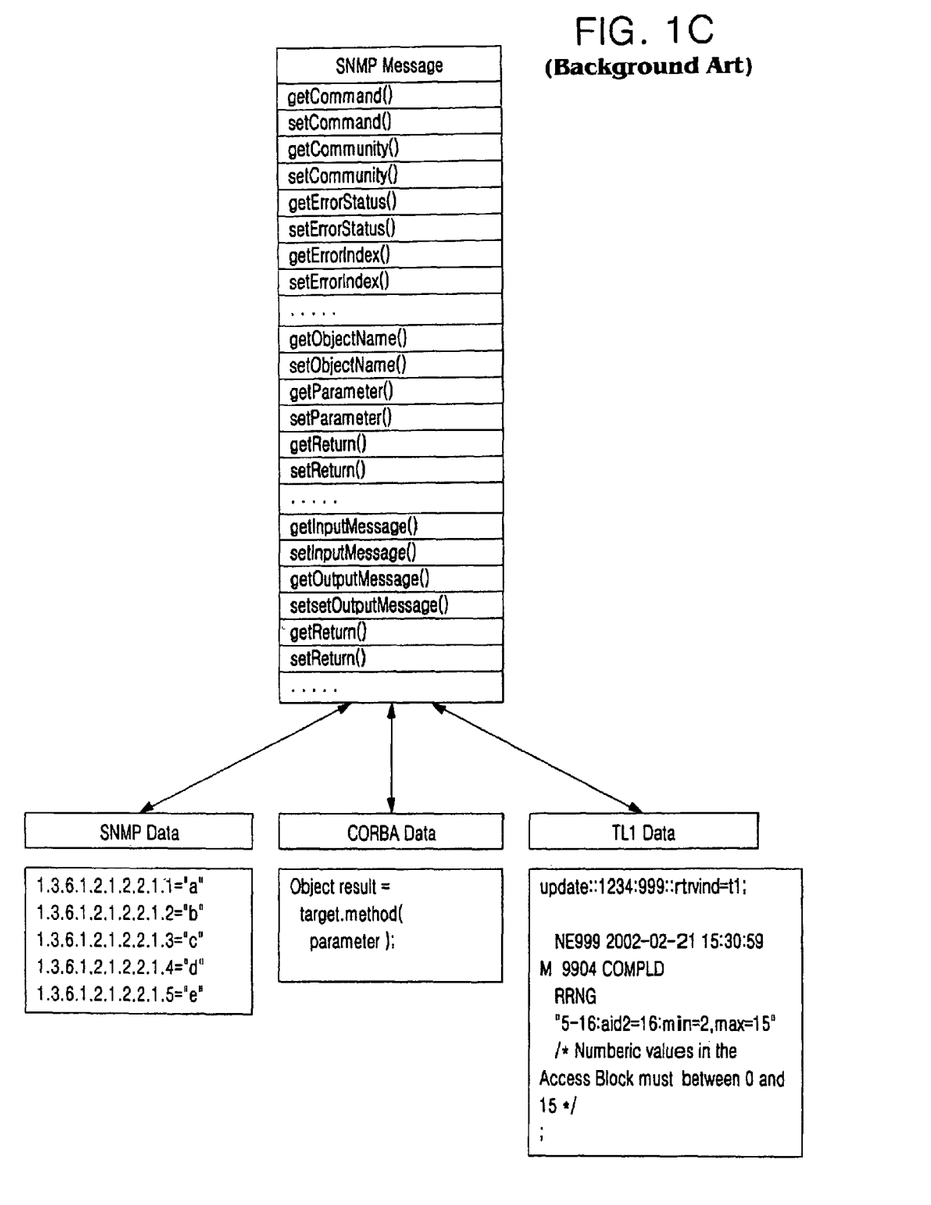
FIG. 1C is a diagram showing another management message of a general network management system.

Second, in a protocol-generic type, a message type with which SNMP, CORBA, and TL1 message types can be expressed is defined as shown in FIG. 1C, and messages transmitted from an external system are converted into a single type and used.

However, since the network management system using the conventional protocol-generic type should have information used in all kinds of protocols, not only does the message type become overcomplicated, but in the case of performing a task using only one protocol an unnecessary load is placed on the system. Furthermore, in the case of using a proprietary protocol or a new protocol not included in the original design, contents are added to a corresponding class and the corrected class cannot have backward compatibility, so the existing system needs to be retested.

SUMMARY OF THE INVENTION

It is an objective of the present invention to provide a network management system that is applicable without changing a management message type of an existing network management system no matter what kind of protocol is added, and enables transmission of necessary information only without loss of functionality due to transmitting unnecessary information even when the system supports only one instead of a plurality of protocols.

According to an aspect of the present invention, there is provided a network management system, comprising a management message storage for registering a key of a management message for network management and a value of the key according to a map configuration; a network management message processing unit for transmitting the management message including the key mapped to the key value of the management message storage for the network management, and a network element receives a management message from the network management processing unit, it extracts a key value corresponding to a key included in the management message from the management message storage, accesses an information value based on the key value from an MIB, and transmits the information value to the network management processing unit.

The management message storage may have a configuration of a Java HashMap where a key value can be contained using a string key, or may use a class provided in a C++ programming language.

The management message storage may have a map configuration including a key to transmit/receive simple network management protocol data, a key to transmit/receive CORBA data, a key to transmit/receive TL1 data, and a key to transmit/receive proprietary data.

The simple network management protocol data of the management message storage may include one or more keys for a simple network management protocol common header, such as "COMMAND" indicating a command of a simple network management protocol packet; "COMMUNITY" indicating a community character string of the simple network management protocol packet; and "VERSION" indicating a version of the simple network management protocol.

The simple network management protocol data of the management message storage may include one or more keys assigning a destination of a simple network management protocol agent, such as "IP_ADDRESS" indicating an IP address of equipment targeted by the simple network management protocol packet; and "PORT" indicating a port of equipment targeted by the simple network management protocol packet.

The simple network management protocol data of the management message storage may include one or more keys used when the data is GET_BULK Request, such as "MAX_REPEAT" indicating a MAX_REPETITION of SNMP GET_BULK; and "NON_REPEAT" indicating a NON_REPEAT of the SNMP GET_BULK.

The simple network management protocol data of the management message storage may include one or more keys used in a simple network management protocol response, such as "ERROR_INDEX" indicating an error occurrence position in the simple network management protocol response; and "ERROR_STATUS" indicating an error occurrence cause in the simple network management protocol response.

The simple network management protocol data of the management message storage may include one or more keys used in the simple network management protocol Trap, such as "SYS_UP_TIME" indicating a port of the simple network management protocol TIMEOUT (millisecond); and "TRAP_OID" indicating the simple network management protocol Version2 TrapOID (The Second VarBind).

The simple network management protocol data including at least two MIB tables in the management message storage may include one or more of the following keys: "LINEAR_NAME" indicating a MIB name based on an environment variable (VarBind); "LINEAR_TYPE" indicating a type based on the VarBind; "LINEAR_INDEX" indicating an index based on the VarBind; and "LINEAR_VALUE" indicating a value based on the VarBind.

The simple network management protocol data including information of only one MIB table in the management message storage may include one or more of the following keys: "COLUMN_NAME" assigning a column of a table to store a name of MIB in the form of an array; "COLUMN_TYPE" assigning a column type of the table to store SnmpVarType in the form of an array; and "ROW_INDEX" assigning a row index of the table so as to store an index of MIB array in a row unit.

The CORBA data of the management message storage may include one or more of the following keys: "NAME_SERVICE" assigning a naming service in the form of a character string; "OBJECT" assigning a CORBA object name in the form of a character string; "METHOD" assigning a method in the form of a character string; "PARA_NAMES" assigning a method parameter name in the form of a Vector; and "RETURN" used when a return value exists in the form of an IDL.

TL1 data of the management message storage may include one or more of the following keys: "TYPE" assigning a message type as either an input message or an output message; "INPUT" assigning an input message character string; and "OUTPUT" assigning an output message character string.

According to another aspect of the present invention, there is provided a network management method, comprising: registering a key of a management message for network management and a value of the key according to a map configuration; transmitting, at a network management unit, a management message including a key necessary for network management to a network element; and when the network element receives the management message, extracting a key value corresponding to the key included in the management message from the management message storage, accessing an information value based on the key value, and transmitting the information value to the network management unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

A network management system according to first embodiment of the present invention is described hereinafter with respect to the accompanying drawings.

Figure 2:
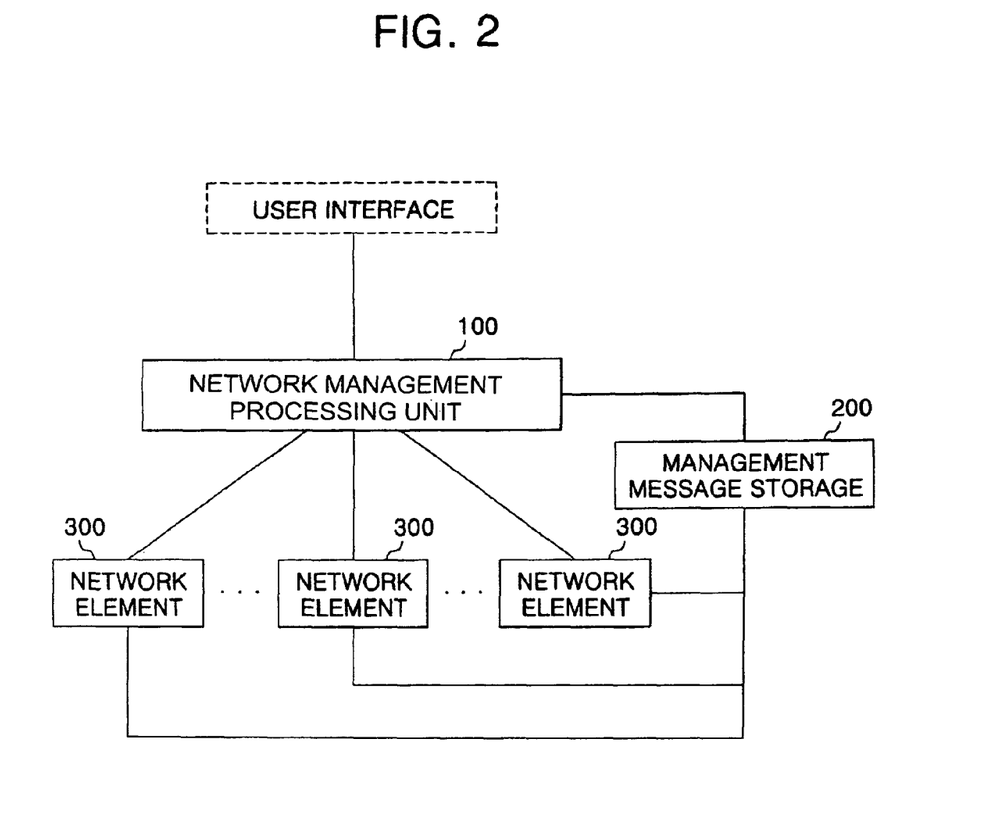
FIG. 2 is a block diagram showing an internal configuration of a network management system in accordance with an exemplary embodiment of the present invention.

FIG. 2 is a block diagram of a network management system in accordance with an exemplary embodiment of the present invention, the network management system including a network management processing unit 100, a management message storage 200, and a network element 300.

Figure 3:
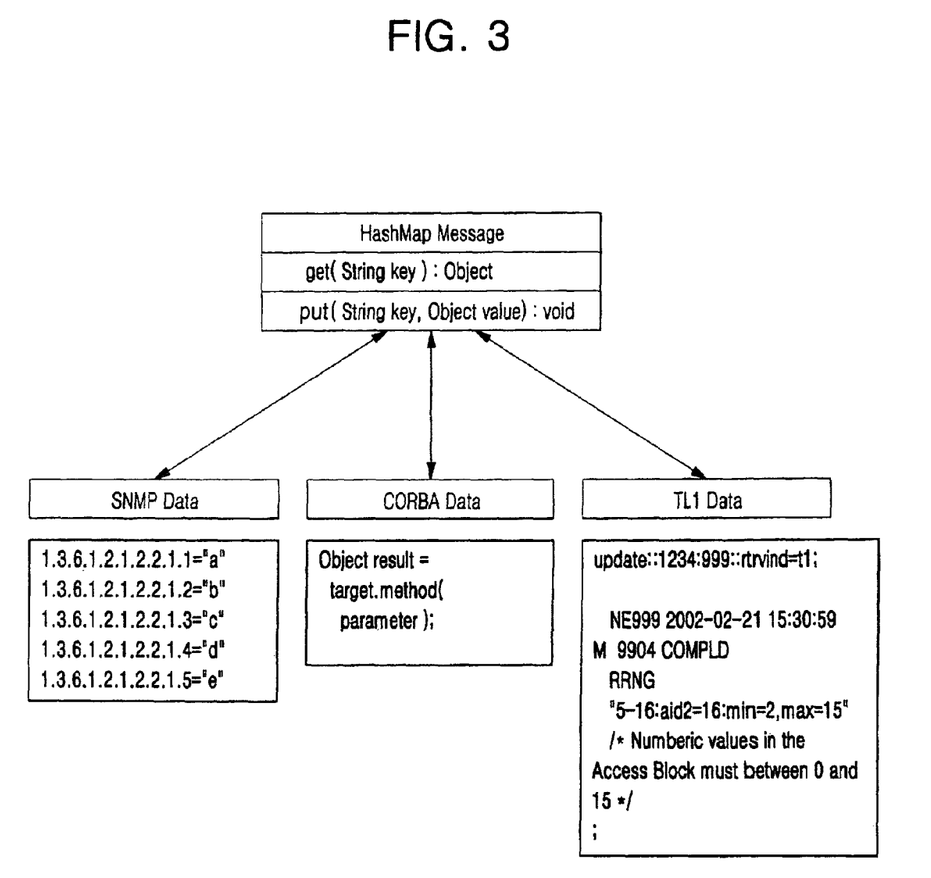
FIG. 3 is a diagram showing a management message of a network management system in accordance with FIG. 2.

The network management processing unit 100 transmits a management message including a key mapped to a key value of the management message storage 200 in order to manage the network. Meanwhile, receiving the management message, the management message storage 200 extracts a key value corresponding to the key included in the management message from the network management processing unit 100, accesses an information value based on the key value, and transmits a response message to network management processing unit 100. At this time, the management message, also transmitted to the network element 300 by the network management processing unit 100, includes, as shown in FIG. 3, at least one of a "message.get (String Key): Object", which is used to obtain a Key value, and a "message.put (String Key, Object value): Void", which is used to store the Key value.

Further, the management message storage 200 registers the Key and the Key value of the management message to manage the network according to a map configuration. At this time, the management message storage 200 is of a Java HashMap configuration in which the key value can be included through a string key, or uses a class of $C^{++}$ programming language. Such a management message storage 200 has a map configuration including a key to transmit/receive simple network management protocol (SNMP) data, a key to transmit/receive Common Object Request Broker Architecture (CORBA) data, a key to transmit/receive Transaction Language 1 (TL1) data, and a key to transmit/receive proprietary data. The simple network management protocol data includes:

a key for a simple network management protocol common header, such as "COMMAND" indicating a command of the simple network management protocol packet, "COMMUNITY" indicating a community character string of the simple network management protocol packet, and "VERSION" indicating a version of the simple network management protocol packet;

a key indicating a destination of the simple network management protocol agent, such as "IP_ADDRESS" indicating an IP address of equipment targeted by the simple network management protocol packet, and "PORT" indicating a port of equipment targeted by the simple network management protocol packet;

a key used in GET_BULK Request, such as "MAX_REPEAT" indicating MAX_REPETITION of SNMP GET_BULK, and "NON_REPEAT" indicating NON_REPEAT of SNMP GET_BULK;

a key used in the simple network management protocol response, such as "ERROR_INDEX" indicating an error occurrence position in the simple network management protocol response, and "ERROR_STATUS" indicating an error occurrence cause in the simple network management protocol response; and a key used in the simple network management protocol trap, such as "SYS_UP_TIME" indicating a port of the simple network management protocol TIMEOUT (millisecond), and "TRAP_OID" indicating the simple network management protocol Version2 TrapOID (The Second VarBind).

Further, the simple network management protocol data including two or more Management Information Base (MIB) tables in the management message storage 200 has a key such as "LINEAR_NAME" indicating MIB NAME based on a VarBind, "LINEAR_TYPE" indicating a type based on the VarBind, "LINEAR_INDEX" indicating an index based on the VarBind, and "LINEAR_VALUE" indicating a value based on the VarBind.

Further, the simple network management protocol data including information of only one MIB table in the management message storage 200 has a key, such as "COLUMN_NAME" assigning a column of the table so as to store the MIB name in the form of an array, "COLUMN_TYPE" assigning a column type of the table so as to store SnmpVarType in the form of an array, and "ROW_INDEX" to store a row index of the table so as to store an index of MIB in a row unit of an array.

Further, the CORBA data in the management message storage 200 has a key, such as "NAME_SERVICE", assigning a Naming Service in the form of a character string, "OBJECT" assigning a name of CORBA Object in the form of a character string, "PARA_NAMES" assigning Method Parameter Name in the form of a Vector, and "RETURN" used when a Return value exists in the form of an IDL.

Further, the TL1 data in the management message storage 200 has a key, such as "TYPE", assigning a type of either Input Message or Output Message, "INPUT" assigning a character string of Input Message, and "OUTPUT" assigning a character string of Output Message.

Further, the proprietary data in the management message storage 200 newly defines only Keys used in the corresponding protocol, and stores the key values of the defined keys in the form of metadata.

When the network element 300 receives a management message from the network management processing unit 100, it extracts a key value corresponding to a key included in the management message from the management message storage 200, accesses an information value based on the key value from an MIB, and transmits the information value to the network management processing unit 100.

An operational procedure of a network management system having the above-described configuration will now be described.

First, the management message storage 200 registers a key of a management message for network management and its key value according to a map configuration. A developer registers the key and key value in the management message storage 200 according to each protocol when developing the network management system. That is, such management message storage 200 has a map configuration including a key to transmit/receive the simple network management protocol data, a key to transmit/receive the CORBA data, a key to transmit/receive the TL1 data, and a key to transmit/receive the proprietary data. The simple network management protocol data includes:

a key for a simple network management protocol common header, such as "COMMAND" indicating a command of the simple network management protocol packet, "COMMUNITY" indicating a community character string of the simple network management protocol packet, and "VERSION" indicating a version of the simple network management protocol packet;

a key indicating a destination of the simple network management protocol agent, such as "IP_ADDRESS" indicating an IP address of equipment targeted by the simple network management protocol packet, and "PORT" indicating a port of equipment targeted by the simple network management protocol packet;

a key used in GET_BULK Request, such as "MAX_REPEAT" indicating MAX_REPETITION of SNMP GET_BULK, and "NON_REPEAT" indicating NON_REPEAT of SNMP GET_BULK;

a key used in the simple network management protocol response, such as "ERROR_INDEX" indicating an error occurrence position in the simple network management protocol response, and "ERROR_STATUS" indicating an error occurrence cause in the simple network management protocol response; and a key used in the simple network management protocol trap, such as "SYS_UP_TIME" indicating a port of the simple network management protocol TIMEOUT (millisecond), and "TRAP_OID" indicating the simple network management protocol Version2 TrapOID (The Second VarBind).

The simple network management protocol data including two or more MIB tables in the management message storage 200 includes a key, such as "LINEAR_NAME" indicating MIB NAME based on a VarBind, "LINEAR_TYPE" indicating a type based on the VarBind, "LINEAR_INDEX" indicating an index based on the VarBind, and "LINEAR_VALUE" indicating a value based on the VarBind.

The simple network management protocol data including information of only one MIB table in the management message storage 200 includes a key, such as "COLUMN_NAME" assigning a column of the table so as to store the MIB name in the form of an array, "COLUMN_TYPE" assigning a column type of the table so as to store SnmpVarType in the form of an array, and "ROW_INDEX" to store a row index of the table so as to store an index of MIB in a row unit of an array.

The CORBA data in the management message storage 200 includes a key, such as "NAME_SERVICE" assigning a Naming Service in the form of a character string, "OBJECT" assigning a name of CORBA Object in the form of a character string, "PARA_NAMES" assigning Method Parameter Name in the form of a Vector, and "RETURN" used when a Return value exists in the form of an IDL.

The TL1 data in the management message storage 200 includes a key, such as "TYPE" assigning a type of either Input Message or Output Message, "INPUT" assigning a character string of Input Message, and "OUTPUT" assigning a character string of Output Message.

The proprietary data in the management message storage 200 newly defines only Keys used in the corresponding protocol, and stores the key values of the defined keys in the form of metadata.

Then, when the manager inputs data needed to search or setup a management object, the network management processing unit 100 transmits "message.get (String Key): Object" needed for network management, or "message.put (String Key, Object value): Void" for storing the key value, to the network element 300. That is, when the network management processing unit 100 transmits "message.get COMMAND: object" to obtain an information value from the network element 300, the network element 300 extracts a key value corresponding to a key (COMMAND) included in the management message from the management message storage 200, accesses an information value based on the key value from the MIB, and transmits the information value to the network management processing unit 100.

Figure 4:
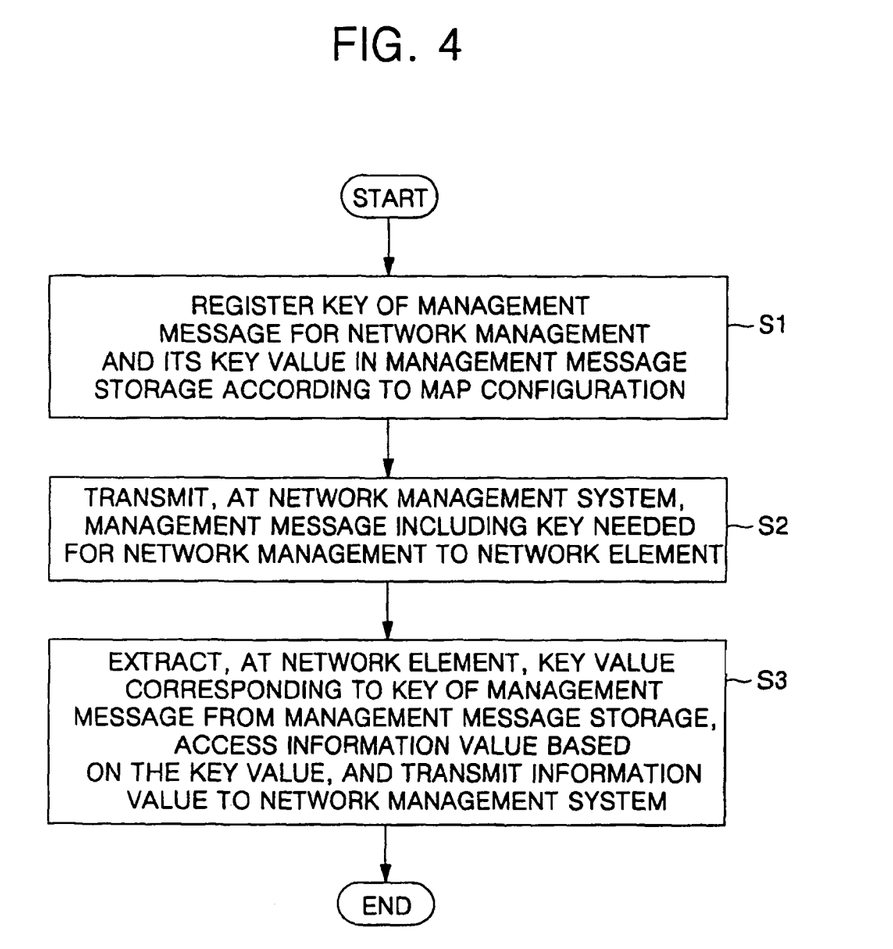
FIG. 4 is a flowchart illustrating a network management method in a network management system in accordance with the exemplary embodiment of the present invention.

An operational procedure of a network management system having the above-described configuration will now be described with reference to FIG. 4.

First, a key of the management message for network management and its key value are registered according to a map configuration (MAP) (S1).

Next, the network management processing unit 100 transmits a management message including a key needed for network management to the network element 300 (S2). That is, the network management processing unit 100 transmits "message.get (String Key): Object;" to obtain a key value, or "message.put (String Key, Object value): Void;" to store the key value in the network element 300.

Subsequently, when the network element 300 receives the management message, it extracts a key value corresponding to the key included in the management message, accesses an information value based on the key value, and transmits the information value to the network management processing unit 100 (S3).

Such a transmission/reception management message, as shown in FIG. 3, of the management system in accordance with the exemplary embodiment of the present invention is comprised of "message.get (String Key): Object" to obtain a key value or "message.put (String Key, Object value): Void" to store a key value to correspond to the management message storage 200 including a key for network management and a "key value" corresponding to the key.

As described above, according to the network management system of the present invention, there is an effect that it is not only possible to support a variety of network management protocols, but an existing message configuration is unaffected even when a new protocol is supported.

Furthermore, according to the network management system of the present invention, there is an effect that it is possible to input necessary information only since information to be input to the message is not determined in advance, so that the network management system can be used even in a system supporting only one type of protocol without any reduction of performance.

While the present invention has been described with reference to exemplary embodiments thereof, it will be understood by those skilled in the art that various changes in form and details may be made therein without departing from the spirit and scope of the present invention as defined by the following claims.

What is claimed is:

1. A network management system, comprising:
   a management message storage to register a key of a management message for network management and a key value mapped to the key;
   a network management message processing unit to transmit the management message comprising the key mapped to the key value; and
   a network element to receive the management message from the network management message processing unit, to extract the key value mapped to the key from the received management message, to access an information value based on the key value from an Management Information Base (MIB), and to transmit the information value to the network management message processing unit,
   wherein the management message storage comprises a map configuration comprising at least one of a key to transmit/receive simple network management protocol (SNMP) data, a key to transmit/receive Common Object Request Broker Architecture (CORBA) data, a key to transmit/receive Transaction Language (TL1) data, and a key to transmit/receive proprietary data.

2. The system according to claim 1, wherein the network management message processing unit maps a response message corresponding to the received management message to the key value registered in the management message storage and transmits the mapped message.

3. The system according to claim 1, wherein the management message is a request message comprising the key mapped to the key value, or is a storage message to store the key value mapped to the key.

4. The system according to claim 1, wherein the management message storage has a configuration of a Java HashMap in which the key value comprises a string key.

5. The system according to claim 1, wherein the management message storage uses a class provided in a $C^{++}$ programming language.

6. The system according to claim 1, wherein the simple network management protocol (SNMP) data of the management message storage comprises at least one key for a simple network management protocol common header, the at least one key comprising a "COMMAND" indicating a command of a simple network management protocol packet, a "COMMUNITY" indicating a community character string of the simple network management protocol packet, or a "VERSION" indicating a version of the simple network management protocol.

7. The system according to claim 1, wherein the simple network management protocol (SNMP) data of the management message storage comprises at least one key assigning a destination of a simple network management protocol agent, the at least one key comprising an "IP_ADDRESS" indicating an IP address of equipment targeted by a simple network management protocol packet or a "PORT" indicating a port of the equipment targeted by the simple network management protocol packet.

8. The system according to claim 1, wherein the simple network management protocol (SNMP) data of the management message storage comprises at least one key used when the SNMP data is a GET_BULK Request, the at least one key comprising a "MAX_REPEAT" indicating a MAX_REPETITION of the SNMP GET_BULK Request or a "NON_REPEAT" indicating a NON_REPEAT of the SNMP GET_BULK Request.

9. The system according to claim 1, wherein the simple network management protocol (SNMP) data of the management message storage comprises at least one key used in a simple network management protocol response, the at least one key comprising an "ERROR_INDEX" indicating an error occurrence position in a simple network management protocol response or a "ERROR_STATUS" indicating an error occurrence cause in the simple network management protocol response.

10. The system according to claim 1, wherein the simple network management protocol (SNMP) data of the management message storage comprises at least one key used in the simple network management protocol Trap, the at least one key comprising a "SYS_UP_TIME" indicating a port of the simple network management protocol TIMEOUT or a "TRAP_OID" indicating a simple network management protocol Version2 TrapOID.

11. The system according to claim 1, wherein the simple network management protocol (SNMP) data comprising at least two MIB tables in the management message storage comprises at least one of the following keys:
"LINEAR_NAME" indicating a MIB name based on an environment variable (VarBind);
"LINEAR_TYPE" indicating a type based on the VarBind;
"LINEAR_INDEX" indicating an index based on the VarBind; and
"LINEAR_VALUE" indicating a value based on the VarBind.

12. The system according to claim 1, wherein the simple network management protocol data comprising information of a MIB table in the management message storage comprises at least one of the following keys:
"COLUMN_NAME" assigning a column of a table to store, in a form of an array, a MIB name;
"COLUMN_TYPE" assigning a column type of the table to store, in a form of an array, SnmpVarType; and
"ROW_INDEX" assigning a row index of the table so as to store an index of MIB array in a row unit.

13. The system according to claim 1, wherein the CORBA data of the management message storage comprises at least one of the following keys:
"NAME_SERVICE" assigning a naming service in a form of a character string;
"OBJECT" assigning a CORBA object name in a form of a character string;
"METHOD" assigning a method in a form of a character string;
"PARA_NAMES" assigning a method parameter name in a form of a Vector; and
"RETURN" used when a return value exists in a form of an Interface Definition Language (IDL).

14. The system according to claim 1, wherein TL1 data of the management message storage comprises at least one of the following keys:
"TYPE" assigning a message type as either an input message or an output message;
"INPUT" assigning an input message character string; and
"OUTPUT" assigning an output message character string.

15. The system according to claim 1, wherein, in the proprietary data of the management message storage, only a key used in a relevant protocol is newly defined and a key value is registered in the defined key.

16. A network management method, comprising:
registering, in a management message storage, a key of a management message for network management and a key value mapped to the key;
transmitting, by a network management unit, the management message comprising the key to a network element; and
in response to the network element receiving the management message, extracting, by the network element, the key value mapped to the key, accessing, by the network element, an information value based on the key value, and transmitting the information value to the network management unit,
wherein the management message storage comprises a map configuration comprising at least one of a key to transmit/receive simple network management protocol (SNMP) data, a key to transmit/receive Common Object Request Broker Architecture (CORBA) data, a key to transmit/receive Transaction Language (TL1) data, and a key to transmit/receive proprietary data.

17. The method according to claim 16, wherein the network management unit maps a response message corresponding to the received management message to the key value registered in the management message storage and transmits the mapped message.

18. The method according to claim 16, wherein the management message is a request message comprising the key mapped to the key value, or is a storage message to store the key value mapped to the key.

19. The method according to claim 16, wherein the management message storage has a configuration of a Java HashMap in which the key value comprises a string key.

20. The method according to claim 16, wherein the management message storage uses a class provided in a C++ programming language.

21. The method according to claim 16, wherein the simple network management protocol (SNMP) data of the management message storage comprises at least one key for a simple network management protocol common header, the at least one key comprising a "COMMAND" indicating a command of a simple network management protocol packet, a "COMMUNITY" indicating a community character string of the simple network management protocol packet, or a "VERSION" indicating a version of the simple network management protocol.

22. The method according to claim 16, wherein the simple network management protocol (SNMP) data of the management message storage comprises at least one key assigning a destination of a simple network management protocol agent, the at least one key comprising an "IP_ADDRESS" indicating an IP address of equipment targeted by a simple network management protocol packet, or a "PORT" indicating a port of the equipment targeted by the simple network management protocol packet.

23. The method according to claim 16, wherein the simple network management protocol (SNMP) data of the management message storage comprises at least one key used when the data is GET_BULK Request, the at least one key comprising a "MAX_REPEAT" indicating a MAX_REPETITION of the SNMP GET_BULK Request, or a "NON_REPEAT" indicating a NON_REPEAT of the SNMP GET_BULK Request.

24. The method according to claim 16, wherein the simple network management protocol (SNMP) data of the management message storage comprises at least one key used in a simple network management protocol response, the at least one key comprising an "ERROR_INDEX" indicating an error occurrence position in a simple network management protocol response or a "ERROR_STATUS" indicating an error occurrence cause in the simple network management protocol response.

25. The method according to claim 16, wherein the simple network management protocol (SNMP) data of the management message storage comprises at least one key used in the simple network management protocol Trap, the at least one key comprising an "SYS_UP_TIME" indicating a port of the simple network management protocol TIMEOUT or a "TRAP_OID" indicating a simple network management protocol Version2 TrapOID.

26. The method according to claim 16, wherein the simple network management protocol (SNMP) data comprising at least two MIB tables in the management message storage comprises at least one of the following keys:
- "LINEAR_NAME" indicating a MIB name based on an environment variable (VarBind);
- "LINEAR_TYPE" indicating a type based on the VarBind;
- "LINEAR_INDEX" indicating an index based on the VarBind; and
- "LINEAR_VALUE" indicating a value based on the VarBind.

27. The method according to claim 16, wherein the simple network management protocol data comprising information of one MIB table in the management message storage comprises at least one of the following keys:
- "COLUMN_NAME" assigning a column of a table to store, in a form of an array, a MIB name;
- "COLUMN_TYPE" assigning a column type of the table to store, in a form of an array, SnmpVarType; and
- "ROW_INDEX" assigning a row index of the table so as to store an index of MIB array in a row unit.

28. The method according to claim 16, wherein the CORBA data of the management message storage comprises at least one of the following keys:
- "NAME_SERVICE" assigning a naming service in a form of a character string;
- "OBJECT" assigning a CORBA object name in a form of a character string;
- "METHOD" assigning a method in a form of a character string;
- "PARA_NAMES" assigning a method parameter name in a form of a Vector; and
- "RETURN" used when a return value exists in a form of an Interface Definition Language (IDL).

29. The method according to claim 16, wherein TL1 data of the management message storage comprises at least one of the following keys:
- "TYPE" assigning a message type as either an input message or an output message;
- "INPUT" assigning an input message character string; and
- "OUTPUT" assigning an output message character string.

30. The method according to claim 16, wherein, in the proprietary data of the management message storage, only a key used in a relevant protocol is newly defined and a key value is registered in the defined key.

* * * * *